July 9, 1968     L. M. HUTNER, JR., ET AL     3,391,687
CULINARY UTENSIL
Filed May 13, 1966
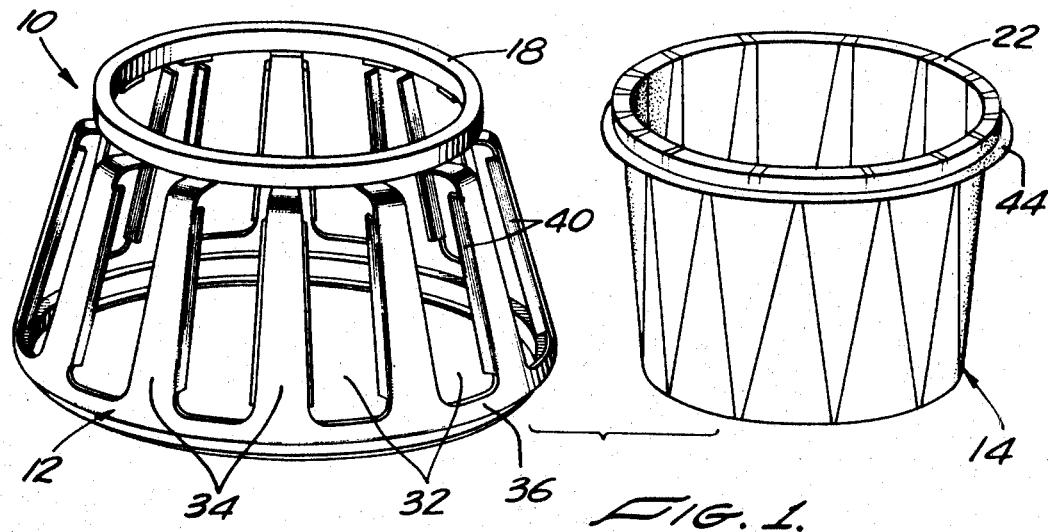
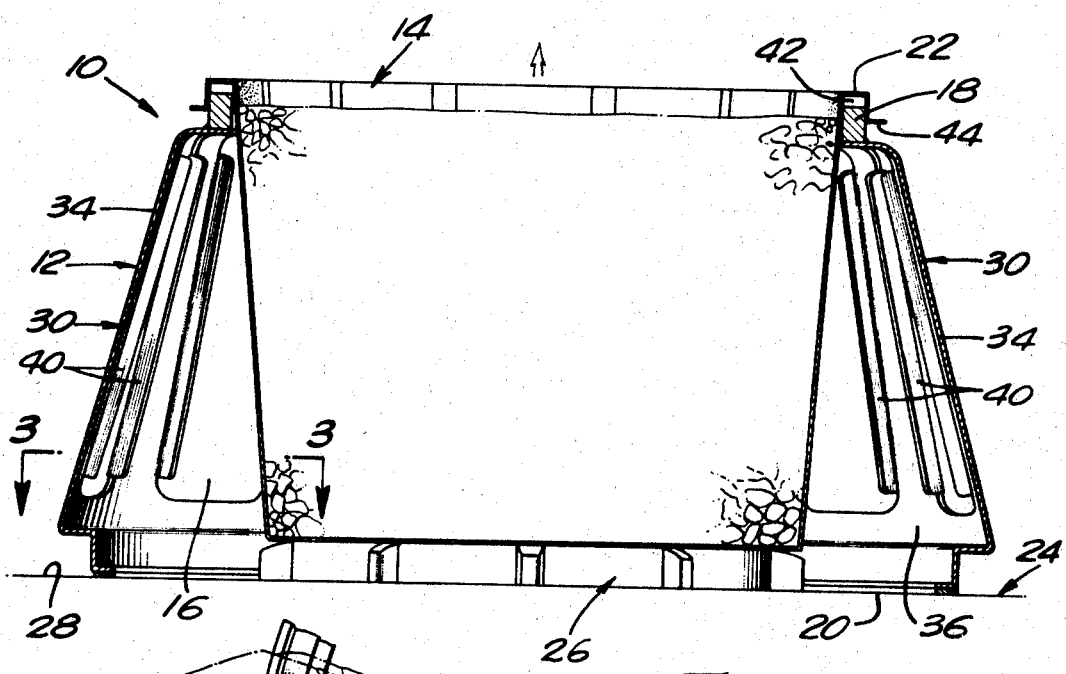
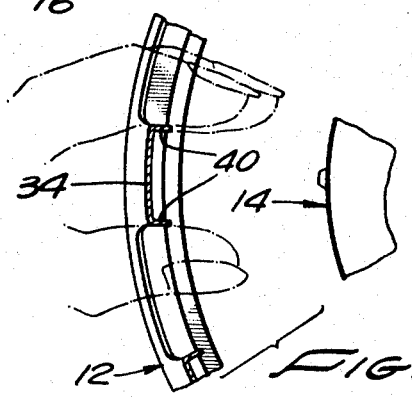
INVENTORS
LAURENCE M. HUTNER, JR.
SHIMON BRAND
BY
ATTORNEYS

United States Patent Office 3,391,687
Patented July 9, 1968

3,391,687
CULINARY UTENSIL
Laurence M. Hutner, Jr., 11614 Chenault St., Los Angeles, Calif. 90049, and Shimon Brand, 12692 Oak Way Drive, Los Alamitos, Calif. 90720
Filed May 13, 1966, Ser. No. 549,975
10 Claims. (Cl. 126—215)

ABSTRACT OF THE DISCLOSURE

A disposable aluminum food container adapted to serve also as a cooking and serving dish, having a circumferential flange at its upper extremity from which it may be supported; and a holder into which the container is adapted to be removably inserted, first during cooking of the food and subsequently during serving of the food, the holder being generally cylindrical in configuration and having an upper rim for supporting the flange of the container, with the wall of the holder being outwardly flared at its lower end and having circumferentially spaced openings for releasing exhaust gases when the container is being suspended for cooking purposes over a gas burner of a stove.

---

This invention relates generally to culinary utensils and, more particularly, to a novel dual purpose culinary utensil which may be used both as a cooking utensil and a serving casserole.

The desire for leisure time has created an ever increasing demand for labor saving devices, particularly household labor saving devices. For this reason, a variety of labor saving culinary devices have been devised which simplify and reduce the time and effort involved in preparing, serving, and cleaning up after meals.

It is a general object of this invention to provide a novel labor saving culinary utensil for this purpose.

A more specific object of the invention is to provide a culinary utensil which may be used as both a cooking utensil for preparing food on a stove and as a casserole for serving the prepared food.

A related object of the invention is to provide a culinary utensil of the character described which may be placed on a stove for cooking food contained in the utensil without damage to the utensil and thereafter placed directly on the table, for serving the food, without marring of the table or burning of the hands of the person handling the utensil.

A highly important object of the invention is to provide a culinary utensil of the character described comprising a supporting base and a removable food container, and wherein when the utensil is placed on a stove, the food container is exposed directly to the heat of the burner and adjusts itself automatically to the height of the burner in such a way as to permit rapid heating of food in the container.

Another important object of the invention is to provide a culinary utensil of the character described wherein the food container is disposable, whereby the task of cleaning the utensil after use is greatly simplified.

A related object of the invention is to provide a culinary utensil of the character described wherein the disposable food container is constructed of light gauge metal, such as aluminum foil, which may be easily punctured to convert the container into a colander for draining off liquid from food in the container after cooking.

Another related object is to provide a culinary utensil of the character described wherein the food container may be utilized for either commercial or home food storage, and thus serve, in effect, as a combined food storage and cooking appliance.

A further object of the invention is to provide a culinary utensil of the character described which is simple in construction, economical to manufacture, lightweight, easy to handle, pleasing in appearance, and otherwise ideally suited to its intended purposes.

Other objects, advantages, and features of the invention will become readily evident as the description proceeds.

With these and such other objects in view, the invention consists in the construction, arrangement, and combination of the various parts of the invention, whereby the objects contemplated are attained, as hereinafter set forth, pointed out in the appended claims, and illustrated in the accompanying drawings.

In these drawings:

FIGURE 1 is a perspective view of a culinary utensil according to the invention, showing the food container removed from the supporting base of the utensil for the sake of clarity;

FIGURE 2 is an enlarged vertical section through the utensil with the food container positioned in the supporting base of the utensil; and FIGURE 3 is an enlarged section taken on line 3—3 in FIGURE 2.

The culinary utensil 10 of the invention which has been selected for illustration in these drawings comprises a supporting base 12 and a food container 14 proper. The base 12 has a central opening 16 extending through its upper and lower ends to receive the container. At the upper end of the base is a container supporting rim 18 which surrounds the upper end of the base opening 16. At the lower end of the base, about the lower end of the base opening, are supporting means 20 which are adapted to rest on the supporting surface, which may be the top surface of a stove when the utensil is used for cooking and the surface of a table when the utensil is used for serving the prepared food.

The food container 14 of the culinary utensil 10 is dimensioned to fit closely, though somewhat loosely, in the upper end of the central opening 16 through the supporting base 12. About the upper end of the container is an outwardly directed rim 22 which overlies the base rim 18. This container rim is adapted for engagement with the base rim to vertically support the container on the base in a position wherein the bottom of the container is substantially flush with or, preferably, located just slightly above the undersurface of the lower base supporting means 20.

When cooking with the culinary utensil 10, the latter is placed on a stove 24, over a burner 26 of the stove, as illustrated in FIGURE 2. One important feature of the invention resides in the fact that the lower supporting means 20 of the utensil base 12 is arranged to rest on the upper stove surface 28 about the burner, rather than directly on the burner. This avoids direct exposure of the supporting means to the heat of the burner. Another important feature of the invention is that the base 12 is open at its bottom so that the food container is exposed directly to the burner heat. Moreover, the bottom of the container is located to rest directly on the burner, as shown in FIGURE 2. Accordingly, rapid heating of food in the container is assured.

In connection with this latter feature of the invention, the supporting base 12 and the food container 14 are axially dimensioned so that when the container rim 22 rests on the base rim 18, the vertical spacing between the undersurface of the base supporting means 20 and the bottom of the container is equal to or slightly less than the vertical height of the burner 26, measured upwardly from the surrounding stove surface 28, of any stove on which the utensil may be used. It should be noted here that this burner height is relatively uniform in all makes of stoves, both gas and electric and that the present utensil may be used on both gas and electric stoves. If the burner height of a particular stove on which the utensil is placed is substantially the same as the vertical spacing, just referred to, between the bottom of the utensil base 12 and the bottom of the food container 14, the container rim 22 may rest on the base rim 18 when the bottom of the container rests on the burner. In the event that the culinary utensil 10 is placed on a stove having a burner height which is substantially greater than the spacing between the bottom of the utensil base and food container, the container rim 22 will continue to rest on the base rim 18 as the utensil is lowered onto the stove, until the bottom of the container engages the burner. The container will then remain stationary during further lowering of the utensil base into contact with the upper stove surface 28. This results in disengagement of the container rim 22 from the base rim 18, as illustrated in FIGURE 2. It is evident, therefore, that the present culinary utensil 10 is, in effect, self adjustable to burners of different height in such a way and as to permit the food container of the utensil to rest directly on the burner and the base of the utensil to rest directly on the surrounding stove surface, regardless of the burner height. Accordingly, the present culinary utensil 10 is uniquely constructed and arranged to accomplish rapid heating of food in the utensil container 10 and stable supporting engagement with the utensil base 12 with the upper stove surface, regardless of the burner height of the stove.

According to a preferred, and further highly important feature of the invention, the food container 14 of the utensil is simply formed from a relatively inexpensive material to render the container disposable after use. In this case, after use, the container may be simply ejected into a trash bag, thus greatly simplifying cleaning of the utensil. For this reason, the food container 14 of the utensil is preferably constructed of light gauge aluminum foil. While the container may be formed in various ways, it may be most conveniently and economically fabricated by a combined forming and folding operation. This method of forming the food container 14 results in a container having the folds illustrated in FIGURE 1.

Referring now in more detail to the illustrated culinary utensil 10, the supporting base 12 of the utensil is fabricated from light gauge sheet metal, such as aluminum. The base has a generally conical configuration which results in a diameter, at the lower end of the base, which is substantially greater than the upper diameter of the base. It is conceivable that the supporting base 12 may be fabricated, as a single unitary structure, by an appropriate stamping and forming operation. The base 12 of the illustrated utensil is composed of three pieces, to wit, a generally conical sheet metal wall 30 which forms the major portion of the base, an upper metal ring which is braised or otherwise fixed to the upper end of the wall and forms the base rim 18, and a lower plastic ring which is adhesively bonded or otherwise joined to the lower end of the conical base wall and forms the base supporting means 20. The base wall 30 is fabricated of light gauge sheet metal, such as aluminum. Opening through the wall are a number of axially extending, generally uniformly circumferentially spaced slots or openings 32. These openings define therebetween a number of upstanding supporting struts or ribs 34. The upper ends of the ribs 34 are turned inwardly and secured to the underside of the upper base ring or rim 18. The lower ends of the ribs 34 are integrally joined by a lower annular portion 36 of the base wall 30. The lower edge of the annular wall portion 36 is turned inwardly, then downwardly, and finally inwardly again, as shown best in FIGURE 2, to define at the lower end of the base wall 30 an inwardly directed annular lip 38. The plastic base ring 20 is secured to the undersurface of this lip. The base wall 30 may be stamped out from flat sheet stock and then rolled into the conical shape illustrated. Alternatively, the wall may be simultaneously stamped and formed into its conical shape.

In addition to their supporting function, the base ribs 34 serve as handles which may be gripped in the manner shown in FIGURE 3 when carrying the utensil 10. The longitudinal or vertical edges of these ribs are preferably turned inwardly to form inwardly directed flanges 40 on the ribs which serve the dual function of reinforcing the ribs and providing gripping surfaces that may be gripped, as shown, without cutting the fingers.

As noted earlier, the container 14 of the culinary utensil 10 is preferably constructed of aluminum foil to render the container disposable after use. The container rim 22 is preferably shaped, as shown in FIGURE 2, to define a downwardly opening channel 42 for loosely receiving the base rim 18 and an outwardly directed lip 44 about the lower edge of the rim. This lip facilitates lifting of the container 14 from the base 12. The depth of the channel 42, measured axially or vertically of the container, is such that the container rim 22 remains engaged with the base rim 18 throughout the range of the vertical self-adjusting movement, referred to earlier, of the container relative to the base.

The inner diameters of the lower plastic ring 20 and lip 38 of the supporting base 12 are made substantially greater than the diameter of the largest burner of the stove on which the utensil 10 may be used. Accordingly, when the utensil is placed on a stove 24, the base rests on the upper stove surface 28 about the burner, as described earlier and illustrated in FIGURE 2, whereby the bottom of the base is not directly exposed to the heat of the burner. The inner surfaces of the base wall 30 are preferably left shiny, or are polished, thus to reflect heat from the burner against the cylindrical wall of the food container 14. The outer surface of the container, in turn, is preferably dulled so as to minimize heat reflection from and maximize heat absorption by the container. These structural features of the utensil 10, together with the low mass light gauge sheet metal construction of the base wall 30 and the large surface area of the wall, afford the supporting base 12 with the ability to cool rapidly when removed from the stove. This permits the utensil to be immediately held without burning of the fingers and placed on a table without marring of the table. The plastic base ring 20 also aids in this regard and, in addition, prevents the utensil from scratching the surface on which it rests.

The openings 32 in the conical base wall 30, in addition to defining the combined reinforcing and gripping ribs 34, serve as vent openings to permit the escape of heat from the interior of the supporting base 12 when cooking with the utensil. These openings, then, aid in retaining the base in a relatively cool condition during cooking, such that the utensil may be immediately removed from the stove after cooking and placed on a table.

A unique feature of the invention resides in the fact that when the food container 14 is constructed of light gauge metal, such as aluminum foil, it may be easily punctured to convert the container into a colander for draining off liquid from food in the container after cooking. The container may also be used to store or handle the food to be cooked, thus providing a combined food storage or handling appliance and a cooking appliance. In this regard, the container may be utilized for commercial food storage or handling, that is the food to be cooked may be packaged and sold in the container, as well as for subsequent food storage in the home.

For convenience, no lid for the culinary utensil 10 has been illustrated. It is obvious, however, that the food container 14 of the utensil may be covered with a lid of suitable size and shape, if desired.

It is now obvious, therefore, that the invention herein described and illustrated is fully capable of attaining the several objects and advantages preliminarily set forth.

While the presently preferred embodiment of the invention has been disclosed for illustrative purposes, it is obvious that various modifications of the invention are possible within the spirit and scope of the following claims.

What is claimed as new in support of Letters Patent is:

1. A culinary utensil adapted for use as both a cooking utensil and a serving casserole, comprising:

a normally upright supporting base having a central opening extending through its normally upper and lower ends, a supporting rim surrounding the upper end of said opening, and lower supporting means about the lower end of said opening adapted to rest on a supporting surface, a food container removably positioned within said opening and having an upper outwardly directed rim overlying and engageable with said supporting rim to vertically support said container on said base with the bottom of said container located adjacent the lower end of said base, said utensil being adapted to be placed on the stove with said lower supporting means resting on the upper stove surface about a burner of the stove, whereby the bottom of said container but not the bottom of said base is directly exposed to the heat of said burner, said base and container being composed entirely of materials capable of withstanding normal cooking temperatures generated by said burner, and said base material having a relatively high coefficient of thermal conductivity and said base having relatively low mass and relatively large surface area such that said utensil may be transferred directly from the stove to a table.

2. A culinary utensil according to claim 1 wherein: said container is constructed of inexpensive light gauge metal, such as aluminum foil, thus to render said container disposable after use.

3. A culinary utensil according to claim 1 wherein: the bottom of said container is spaced slightly above the bottom of said base when said container rim rests on said supporting rim, whereby when said utensil is placed on a table, said container bottom is spaced from the table surface.

4. A culinary utensil according to claim 1 wherein: said container is freely vertically movable relative to said base, thus to permit said container to vertically adjust itself relative to said base when said utensil is placed on a stove in such a way as to enable said container to rest directly on the burner of said stove and said base to rest on the upper stove surface surrounding said burner.

5. A culinary utensil according to claim 1 wherein: said base comprises a generally conical sheet metal wall having a number of relatively large axially extending circumferentially spaced openings therein, said openings permitting heat to escape from the interior of said base when said utensil is placed on a stove, and said wall openings defining therebetween handle forming ribs which are adapted to be gripped when carrying said utensil.

6. A culinary utensil according to claim 5 wherein: said ribs have inwardly directed, combined reinforcing flanges along their longitudinal edges.

7. A culinary utensil according to claim 1 wherein: said base comprises a generally conical wall having a number of relatively large axially extending circumferentially spaced openings through which heat may escape from the interior of said base, said base having inner reflective surfaces for reflecting heat from said burner toward said container, and the outer surface of said container being dulled to minimize heat reflection from and maximize heat absorption by said container.

8. A culinary utensil adapted for use as both a cooking utensil and a serving casserole, comprising:

a normally upright supporting base having a central opening extending through its upper and lower ends and including a generally conical sheet metal wall surrounding said central opening and having a number of axially extending circumferentially spaced openings, an annular supporting rim at the upper end of said wall surrounding the upper end of said central opening, and an annular base supporting ring at the lower end of said wall and surrounding the lower end of said central opening, a food container removably positioned within the upper end of said central opening and having an outwardly directed rim at its upper end overlying and engageable with said supporting rim to support said base container on said base with the bottom of said container located adjacent the lower end of said base, said container being constructed of a relatively inexpensive light gauge material, such as aluminum, to render said container disposable after use, said utensil being adapted to be place don a stove with said container resting on a burner of said stove and said base ring resting on the upper stove surface surrounding said burner, whereby the bottom of said container but not the bottom of said base is directly exposed to the heat of said burner, said base wall openings defining therebetween combined upstanding reinforcing and gripping ribs which may be gripped when carrying said utensil, and said container being adapted to handle and store food prior to cooking and to be punctured after cooking to drain off liquid from the cooked food.

9. A culinary utensil according to claim 8 wherein: said container is freely vertically movable relative to said base, whereby said container is self adjustable to stove burners of different height.

10. A culinary utensil according to claim 8 wherein: said base wall has inner reflective surfaces for reflecting heat from said burner toward said container, and the outer surfaces of said container are dulled, thereby to minimize heat reflection from and maximize heat absorption by said container.

References Cited

UNITED STATES PATENTS

| 1,952,776 | 3/1934 | Quinlan | 126—215 X |
| 2,282,400 | 5/1942 | Ginnel | 126—215 X |
| 3,179,036 | 4/1965 | Luker | 126—376 X |

KENNETH W. SPRAGUE, *Primary Examiner.*